United States Patent
Rick

(10) Patent No.: US 8,851,517 B2
(45) Date of Patent: Oct. 7, 2014

(54) SAFETY DEVICE WITH ELASTIC MEMBRANE

(71) Applicant: GM Global Technology Operations LLC, Detroit, MI (US)

(72) Inventor: Ulrich Rick, Braunweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/656,399

(22) Filed: Oct. 19, 2012

(65) Prior Publication Data

US 2013/0106084 A1    May 2, 2013

(30) Foreign Application Priority Data

Oct. 20, 2011 (DE) .................... 10 2011 116 450

(51) Int. Cl.
 *B60R 21/16* (2006.01)
(52) U.S. Cl.
 USPC ................................ 280/743.1; 280/728.2
(58) Field of Classification Search
 USPC ............................................ 280/743.1, 728.2
 See application file for complete search history.

(56) References Cited

U.S. PATENT DOCUMENTS

| | | | |
|---|---|---|---|
| 4,556,236 A | 12/1985 | Scholz et al. | |
| 5,062,664 A * | 11/1991 | Bishop et al. | 280/728.2 |
| 5,431,435 A * | 7/1995 | Wilson | 280/728.3 |
| 5,452,914 A | 9/1995 | Hirai | |
| 5,879,767 A | 3/1999 | Matsushima et al. | |
| 5,904,370 A | 5/1999 | Steiner et al. | |
| 5,924,724 A | 7/1999 | Nakamura et al. | |
| 5,997,034 A | 12/1999 | Hirai et al. | |
| 6,170,871 B1 | 1/2001 | Goestenkors et al. | |
| 6,467,802 B2 | 10/2002 | Heigl | |
| 2002/0017779 A1 | 2/2002 | Gilpatrick et al. | |
| 2004/0100080 A1 | 5/2004 | DePue et al. | |
| 2005/0189054 A1 | 9/2005 | Zeuner et al. | |
| 2006/0066088 A1 | 3/2006 | Hier et al. | |

FOREIGN PATENT DOCUMENTS

| | | |
|---|---|---|
| DE | 4038910 A1 | 6/1992 |
| DE | 19546143 A1 | 6/1997 |
| DE | 19934249 A1 | 2/2001 |
| DE | 10232287 A1 | 2/2004 |
| DE | 102005052381 A1 | 5/2007 |
| DE | 102006013016 A1 | 9/2007 |
| DE | 102010006266 A1 | 8/2011 |

OTHER PUBLICATIONS

German Patent Office, German Search Report for Application No. 102011116450.6, dated Jun. 20, 2012.

* cited by examiner

*Primary Examiner* — Ruth Ilan
(74) *Attorney, Agent, or Firm* — Ingrassia Fisher & Lorenz, P.C.

(57) ABSTRACT

In various embodiments, a safety device for a motor vehicle is provided. The safety device includes an elastic membrane, which partially or completely delimits a hollow space, which is provided for an accident-initiated filling subject to elastically expand the membrane. The elastic membrane is covered by a separate envelope in a gas-tight manner, which provides an opening through the expansion of the membrane.

11 Claims, 1 Drawing Sheet

SAFETY DEVICE WITH ELASTIC MEMBRANE

CROSS-REFERENCE TO RELATED APPLICATION

This application claims priority to German Patent Application No. 10 2011 116 450.6, filed Oct. 20, 2011, which is incorporated herein by reference in its entirety.

TECHNICAL FIELD

The present disclosure relates to a safety device, in particular for a motor vehicle, with an elastic membrane which delimits a hollow space, which is provided for the accident-initiated filling subject to elastic expansion of the membrane.

BACKGROUND

From DE 195 46 143 A1 a safety device for a motor vehicle is known, wherein an expandable bladder of rubber or latex is inflated.

Elastomers, in particular rubber, comprise active substances which over the course of time escape from the material, in particular outgas. In particular, such active substances can be aromatic substances, allergens or other harmful substances. For example, rubber emits aromatic substances which are perceived as unpleasant by many persons. Such active substances escaping from an elastic membrane of corresponding material impair its use in safety devices, in particular when these are arranged in spatial proximity to persons, so that these are exposed to the escaping active substances in higher concentration.

Accordingly, it is desirable to make available an improved safety device.

SUMMARY

According to an embodiment, a safety device comprises an elastic membrane, which partially or completely delimits at least one hollow space, which is provided for the accident-initiated filling subject to elastically expand the membrane.

A membrane is a body the wall thickness of which relative to its surface in a state that is not elastically deformed is small, in particular a body wherein the quotient of wall thickness divided by surface area is a maximum of 0.05%, for example a maximum of 0.01%, as is the case for example with a rectangular plate having 10 cm side length and 1 mm wall thickness ($1/(100\times100)=0.01\%$). An elastic membrane is a membrane which is highly deformable elastically, in particular a membrane, the elongation at break of which, for example in the tensile test according to DIN53504, is at least 100% and at least 500% and/or the modulus of elasticity of which at room temperature is a maximum of 0.5 GPa, for example a maximum of 0.1 GPa. An elastic membrane in one embodiment comprises one or a plurality of elastomers, and in some embodiments it consists of this elastomer or these elastomers. An elastomer can be in particular natural or synthetic rubber, silicone or a thermoplastic elastomer (TPE).

A hollow space can, at least substantially, be entirely or wholly delimited by the elastic membrane in that it is embodied in a double-walled or hose-like manner. This makes available a lot of expansion material and can thus make possible a greater expansion. Equally, a hollow space can only be partially delimited by the elastic membrane in that it is single-walled and fastened to a carrier, by its edge, in an at least substantially fluid-tight manner, which carrier in turn defines a wall of the hollow space. Relative to a double-walled embodiment, this can reduce the installation space. In particular, the carrier can be fastened to a structural element of a motor vehicle or form such. Equally, a carrier can form a housing of the safety device, in particular of the gas generator, or form part of such a housing.

According to an aspect, the membrane is covered by a separate envelope in a gas-tight manner. Generalizing, gas-tight is to mean that the envelope covers the membrane in such a manner that at least one undesirable active substance, which escapes from the membrane, does not penetrate the envelope, at least not substantially. In particular, the envelope can form a barrier for this active substance, so that it at least substantially does not reach a person, in particular an occupant of a motor vehicle with a safety device according to the present disclosure. Covering is to mean that the envelope hermetically covers the membrane either alone or together with a carrier, to which the envelope is fastened in a gas-tight manner.

The separate envelope is provided for the opening through the expansion of the membrane. Here, the envelope can be at least partially destroyed, in particular disassembled or torn. To this end, it can comprise one or a plurality of predetermined opening points, which can in particular be defined through a material weakening. In addition or alternatively, a detaching of the envelope from a carrier can be provided through the expansion of the membrane.

In one embodiment, the envelope is designed flexibly. This can facilitate in particular the stowage of the membrane and/or improve the haptic impression of the safety device. In particular, the envelope can be a single or multiple-layer foil, wherein at least one layer can be designed as barrier for an active substance escaping from the membrane.

Equally, the envelope can be designed dimensionally stable. In particular, it can thus simultaneously act as a carrier, to which the membrane is fastened, and in some embodiments as a housing or part of a housing, in which the membrane is received.

In one embodiment, the envelope is connected to a carrier through material joining, for example through vulcanizing, gluing and/or welding. Additionally or alternatively, it can also be detachably fastened to the carrier, for example through screwing, or through caulking. As explained above, the carrier can act as housing or part of a housing in which the membrane is received. The envelope can also be designed as a coating, which is gas-tight relative to one or a plurality of the active substances, in particular allergens, aromatic substances and/or pollutants escaping from the membrane.

In a one embodiment, the envelope is additionally or alternatively fastened to the membrane in a materially joined manner, for example through vulcanizing, gluing and/or welding. This can prevent a relative movement and thus a chafing between the membrane and the envelope.

According to a further aspect, which can be combined with the aspect of the gas-tight envelope explained above, the safety device comprises one or a plurality of catalysts for removing one or a plurality of active substances escaping from the membrane.

Active substances escaping from the membrane can in particular be aromatic substances, allergens and/or pollutants. Through a suitable catalyst, these are removed, entirely or at least partially through oxidation or oxidative reactions, in oxygen, water and/or other reaction products.

A catalyst can in particular comprise one or a plurality of metals, in particular at least one precious metal, such as silver, gold, platinum, iron and/or titanium, a salt and/or an oxide thereof, for example titanium oxide $TiO2$.

In addition or alternatively to one or a plurality of catalysts, the safety device can comprise one or a plurality of overlaying active substances for the active overlaying of one or a plurality of active substances escaping from the membrane. An overlaying active substance comprises at least one fragrant substance, for example a citrus, pine, rose or other fragrance. In particular, an overlaying active substance can comprise or be an ethereal oil. An active overlay here is to mean in particular that the overlaying active substance has the same active mechanism as the active substances escaping from the membrane, for example an olfactory effect. Thus, the overlaying of a smell of the elastic membrane in particular with a fragrant substance it is possible to arrange the safety device in spatial proximity to a person, in particular in an interior of a motor vehicle, on an item of clothing or the like.

One or a plurality of catalysts and/or overlaying active substances can be arranged in particular in the membrane. To this end, the membrane can be suitably produced, doped, impregnated, coated or the like. Additionally or alternatively, one or a plurality of catalysts and/or overlaying active substances can be arranged on a carrier, on which the membrane is fastened and/or on in particular, in a separate envelope, which covers the membrane in a gas-tight manner and is provided for the opening through the expansion of the membrane. Carrier and/or envelope can be produced, doped, impregnated, coated or the like with the catalyst or catalysts and/or overlaying active substances.

In addition or alternatively, it is possible to arrange one or a plurality of catalysts and/or overlaying active substances adjacent to the membrane. By means of this, active substances escaping from the membrane can also be efficiently removed or overlayed. In particular, a catalyst carrier and/or an overlaying active substance storage unit can be arranged on, in particular, in a housing or an envelope in which the membrane is received.

In one embodiment, one or a plurality of catalysts are present in each case in particle form, wherein the particle size amounts to a maximum of 500 nm, in particular to a maximum of 100 nm and to a maximum of 25 nm. Such nano particles can be added during the production of membrane, carrier, in particular housing, and/or envelope, they are equally suitable for subsequent coating.

In a further embodiment, the safety device comprises a filling fluid source. This can comprise a control device which is equipped in order to fill one or a plurality of hollow spaces of the safety device on the basis of an activation signal, which is transmitted to the control device for example from one or a plurality of spacing, deceleration, deformation and/or force sensors. To this end, the control device can comprise a computer unit for processing the activation signal, a valve device in order to fluidly connect the filling fluid source to the hollow space or to the hollow spaces, and/or an ignition device for the pyrotechnical liberation of filling fluid. A filling fluid source is equipped in particular for the accident-initiated filling when it automatically initiates, in particular carries out the filling as soon as an imminent or occurred accident has been detected.

The filling fluid source can comprise one or a plurality of pyrotechnical and/or pressure gas generators. These can be connected to the hollow space or hollow spaces via one or a plurality of filling fluid lines and be spaced from these. In a further embodiment, the filling fluid source comprises one or a plurality of micro gas generators (MGG). In a further embodiment, these can be designed as a structural unit with the membrane and be arranged directly on or even in a hollow space. In one embodiment, the filling fluid source is at least partially fastened to a carrier, to which the membrane is also fastened.

The membrane can be designed in single or multiple layers. In particular, reinforcing elements such as, for example, bands, areal elements or nets, of textile material, can be locally arranged on a membrane, which have a greater modulus of elasticity and therefore expand less during inflating. Reinforcing elements can be connected at certain locations or substantially with a complete side to the inside and/or outside of the membrane in a materially joined manner, for example glued, welded, laminated-in or vulcanized thereon. The elastic membrane then expands during inflating in a substantially tied-up manner through reinforcing elements connected to it in certain locations and acting as catching bands or in addition to the reinforcing elements that are completely connected to it, so that these influence the shape and expansion characteristic of the inflated membrane.

In various embodiments, a safety device is used in a motor vehicle, in particular in a passenger car, wherein the hollow space is provided for catching an occupant. Equally, the safety device can be, for example, on an item of clothing in order to protect its wearer in the event of an accident.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or its application and uses. Furthermore, there is no intention to be bound by any theory presented in the preceding background or the following detailed description.

Figure 1:
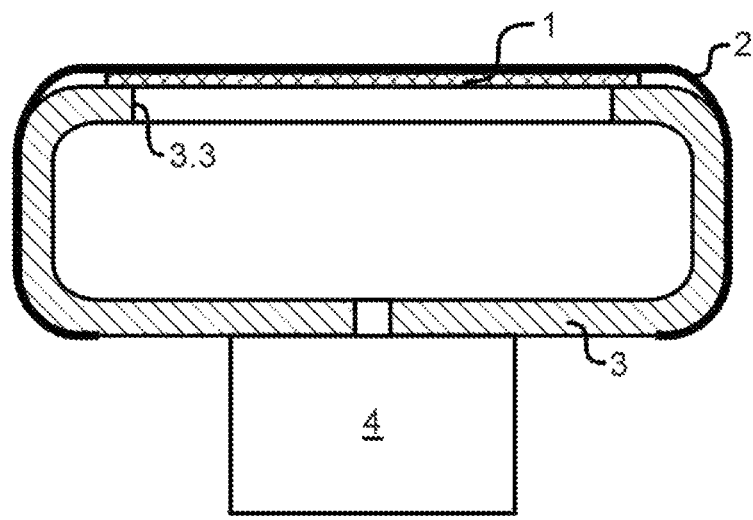
FIG. 1 illustrates a safety device according to an embodiment of the present disclosure in cross section.

FIG. 1 shows in cross section a safety device according to one embodiment with a carrier 3 of plastic, which has an open, U-shaped cross section. An opening 3.3 of the carrier 3 is spanned by an elastic membrane 1 of synthetic or natural rubber, which is fastened on the edges to the carrier 3 in a materially joined manner, for example vulcanized on or glued.

A film-like separate envelope 2 hermetically covers the membrane 1 towards the surroundings. To this end, it engages over the membrane 1 and is fastened to the carrier 3 in a materially joined manner, for example glued. Additionally or alternatively it can also be glued to the membrane 1 (not shown).

The envelope 2 is designed as an olfactory barrier, which is at least substantially tight with respect to aromatic substances, in particular a rubber smell of the membrane 1. In this manner, the membrane 1 can be used in particular without further treatment in a safety device, which is only or also separated from a passenger interior of a motor vehicle through the envelope 2.

In the case of an accident, a gas generator 4 fills a hollow space partially defined by the membrane 1, partially by the carrier 3, as a result of which the membrane 1 expands elastically and forms an impact cushion for catching a passenger. In the process, the membrane 1 tears the film-like envelope 2.

Figure 2:
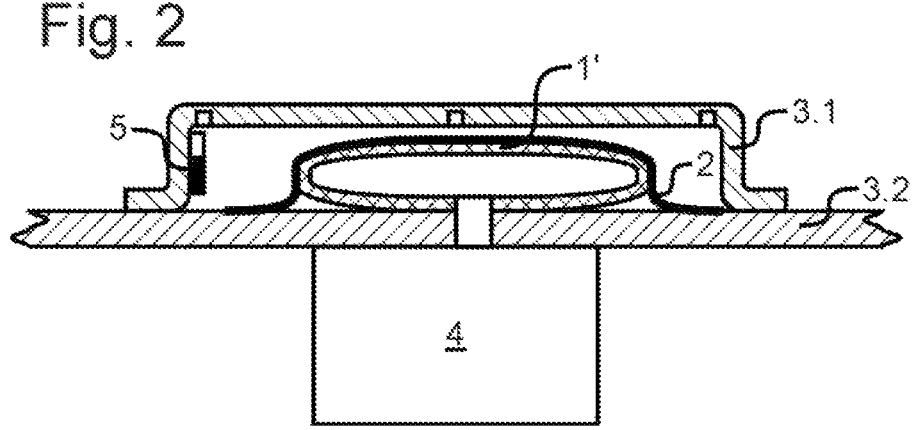
FIG. 2 illustrates a safety device according to a further embodiment of the present disclosure realized corresponding to FIG. 1.

In a representation corresponding to FIG. 1, FIG. 2 shows a safety device according to a further embodiment. Elements corresponding to the embodiment described above are designated through identical reference characters, so that in the following only the differences to the embodiment according to FIG. 1 are discussed.

With the embodiment according to FIG. 2, the hose-like membrane 1' delimits the hollow space entirely, i.e. without the carrier, and to this end is designed in a double-walled manner and connected to the gas generator 4. With an outside, the membrane 1' is fastened in a materially-joined manner to a structural element 3.2 of the motor vehicle, for example glued on, which forms a carrier for the membrane 1'.

Additionally to the envelope 2, the membrane is covered by a housing lid 3.2 of plastic, which is fastened to the structural element 3.2 in a gas-tight manner, for example glued on or welded on, and itself is designed in a gas-tight manner. In this case, the envelope 2 can be omitted. Advantageously, the covering function with respect to the active substances, in particular pollutants and/or aromatic substances escaping from the membrane 1' is integrated in the housing lid 3.1, which acts as a dimensionally stable envelope. Equally, the housing lid 3.2 itself and/or its fastening on the structural element 3.2 can be designed not gas-tight and thus simpler and active substances escaping from the membrane 1' be retained through the flexible, film-like envelope 2. The gas-tight envelope 2 can also be provided, as in the exemplary embodiment of FIG. 2, in addition to a gas-tight housing lid 3.1, which is also fastened to the structural element 3.2 in a gas-tight manner, in order to form a second barrier and/or retain active substances escaping from the membrane 1' even upon an opening of the housing lid 3.1. Generally, a film-like envelope 2 and an inherently stiff envelope, as in this case in the form of a housing lid 3.2, can also be gas-tight relative to different active substances escaping from the membrane 1', for example through suitable materials, coatings or the like.

In addition or alternatively to the hermetic covering of the membrane through one or a plurality of envelopes 2, 3.1 described above, as shown in FIG. 2, a catalyst and/or fragrance storage unit 5 can be arranged on the surface of the housing lid 3.1 facing the membrane 1'. Through a catalyst, active substances, especially when the housing lid 3.1 has no barrier function and no envelope 2 is provided, in particular an elastomer smell of the membrane 1' can be removed and thus neutralized. Equally, through a fragrance storage unit, which gives off fragrances, an elastomer smell of the membrane 1' can be overlayed and thus largely be neutralized olfactorily.

Additionally or alternatively, a catalyst and/or fragrance storage unit can also be arranged on the carrier 3 (FIG. 1) or 3.2 (FIG. 2), on which the membrane 1 (FIG. 1) or 1' (FIG. 2) is fastened.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A safety device for a motor vehicle, comprising:
   an elastic membrane, which partially or completely delimits a hollow space, which is provided for an accident-initiated filling subject that elastically expands the membrane, and having an escaping active substance,
   a catalyst for a removal of the escaping active substance; and
   an active overlaying substance for active overlaying of the escaping active substance, and
   wherein the elastic membrane is covered by an envelope in a gas-tight manner, which provides an opening through the expansion of the membrane.

2. The safety device according to claim 1, wherein the envelope is a flexible or dimensionally stable design.

3. The safety device according to claim 1, wherein the envelope is fastened to at least one of a carrier and the elastic membrane.

4. The safety device according to claim 3, wherein the envelope is fastened to at least one of the carrier and the elastic membrane in a materially joined manner.

5. The safety device according to claim 1, wherein the overlaying active substance comprises at least one fragrance substance.

6. The safety device according to claim 1, wherein the catalyst comprises a metal from the group consisting of silver (Ag), gold (Au), platinum (Pt), iron (Fe) and/or titanium (Ti), a salt and oxide.

7. The safety device according to claim 1, wherein the catalyst is present in particle form, wherein the particle size is a maximum of 500 nm.

8. The safety device according to claim 7, wherein the envelope is arranged separate and covers the elastic membrane in a gas-tight manner and is provided for the opening through the expansion of the elastic membrane.

9. The safety device according to claim 7, wherein the overlaying active substance or catalyst is arranged on a surface of the carrier or of the envelope facing the elastic membrane.

10. The safety device according to claim 1, wherein at least one of an overlaying active substance and the catalyst is fastened on a carrier on which the elastic membrane is fastened.

11. The safety device according to claim 1, wherein the elastic membrane comprises at least one elastomer.

* * * * *